Figure 1:
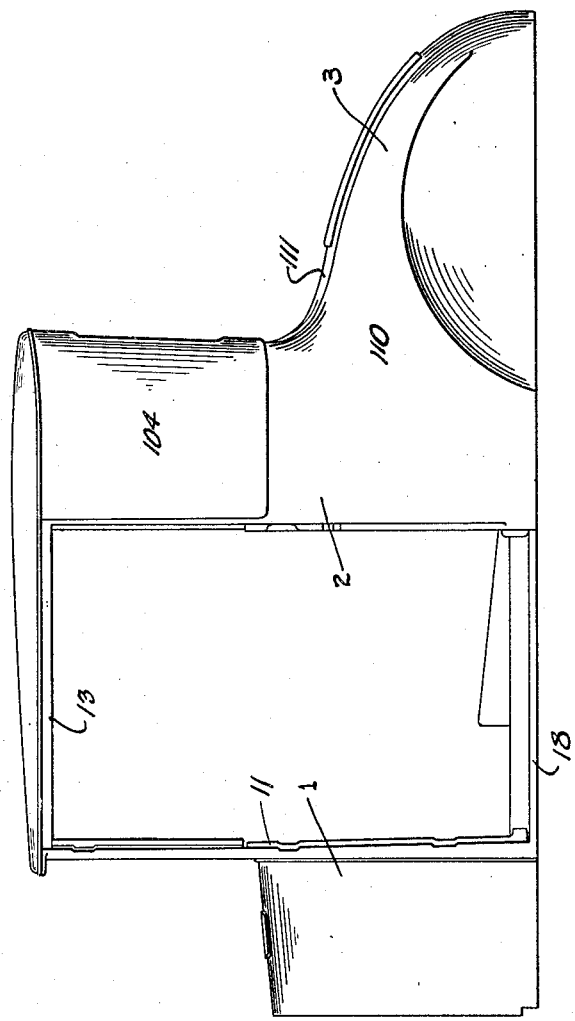

June 30, 1931.  J. LEDWINKA  1,812,441
AUTOMOBILE BODY
Filed Dec. 15, 1926  4 Sheets-Sheet 1

INVENTOR.
JOSEPH LEDWINKA
BY
John P. Barber
ATTORNEY.

INVENTOR.
JOSEPH LEDWINKA
BY John P. Barbox
ATTORNEY.

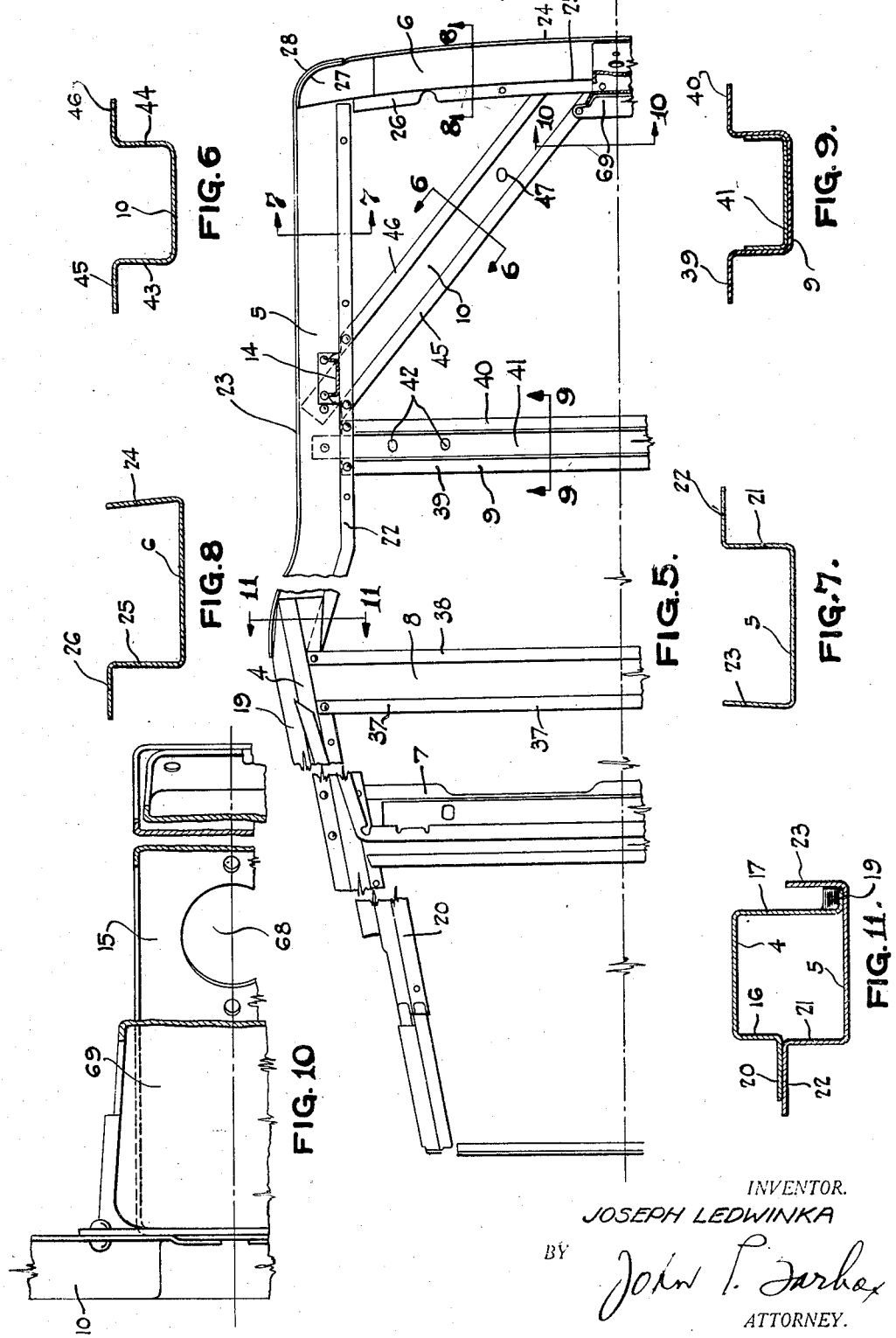

Patented June 30, 1931

1,812,441

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY

Application filed December 15, 1926. Serial No. 154,884.

This invention relates to automobile bodies constructed of pressed metal, and, more particularly, to a closed automobile body thus constructed.

The chief aim of automobile body builders is to reduce the weight and number of parts of the body and, at the same time, not impair its strength. The accomplishment of such aim is controlled to a large degree by considerations of efficiency and economy in production. The various parts or elements of the body must be capable of being readily formed by quantity production methods, and after formation, of being easily assembled and secured together. Since the preferable manner of securing the members together is by spot welding, it is important they be so formed, that access is provided for the welding operation. Further, the various elements or members must be designed with a view to the ultimate cooperative relationship they are to have in the completed body. In other words, each element should, so far as possible, perform a strengthening or bracing function for the other elements of the body, in the end that the assembled elements comprise an integral self sustaining structure.

The principal object of this invention is to provide a body wherein those aims, as above set forth, are accomplished in a high degree.

There are other objects and advantages inherent in the inventon which will become apparent from time to time as the description thereof progresses.

A practical embodiment of the invention is shown in the drawings, there being illustrated therein a body structure of the coupé type, although it should be well understood, that the elements readily adapt themselves to the formation of bodies of other types.

Figure 2:
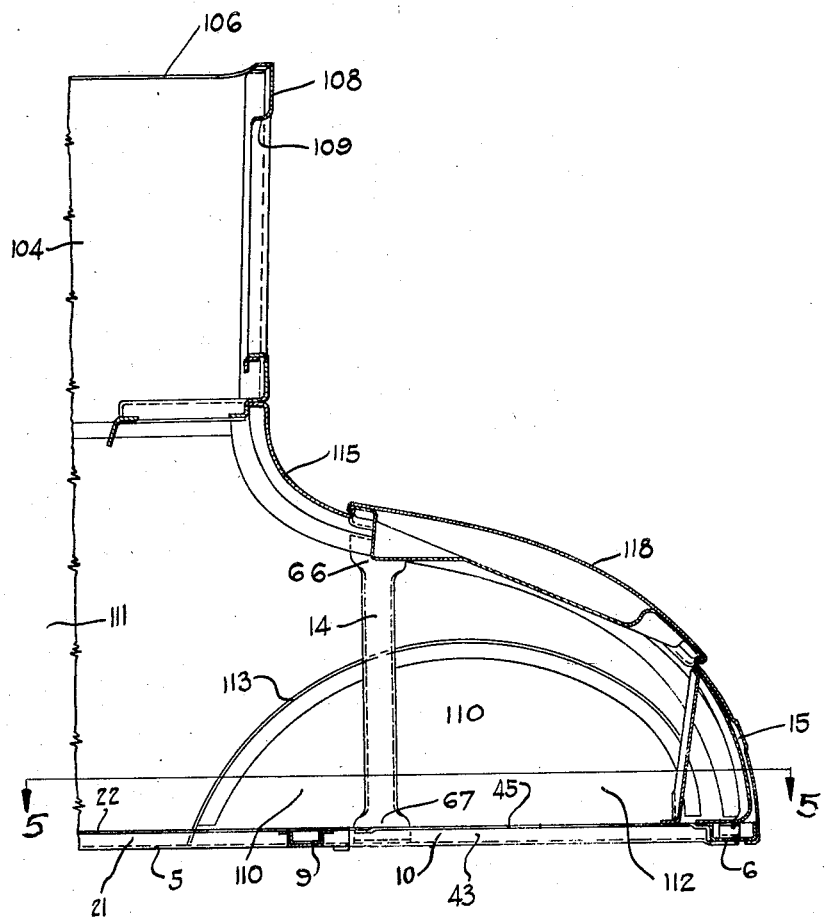
Figure 3:
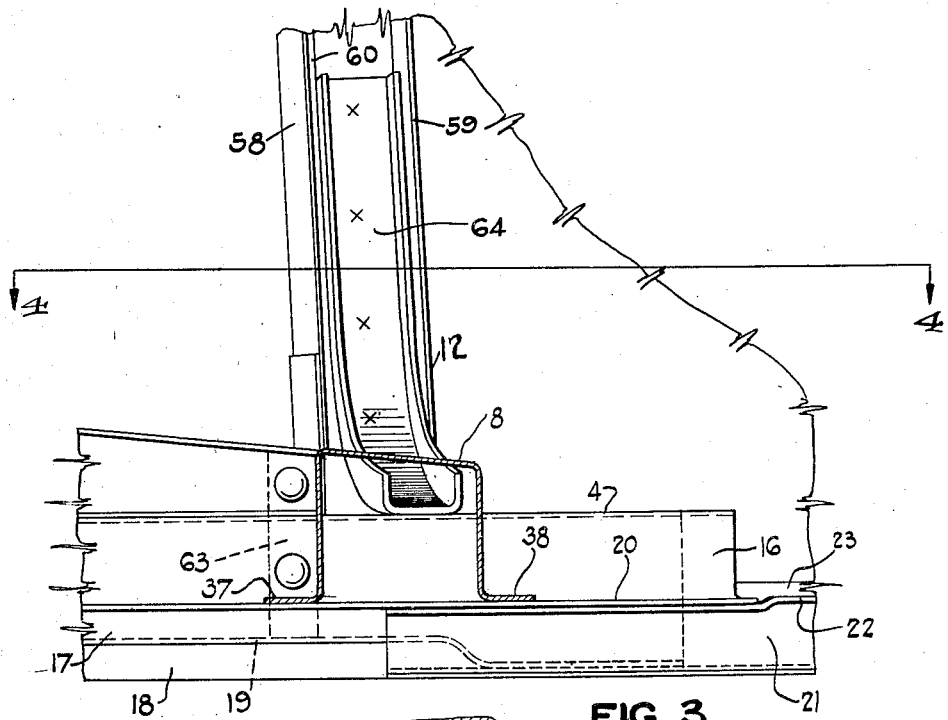
Figure 4:
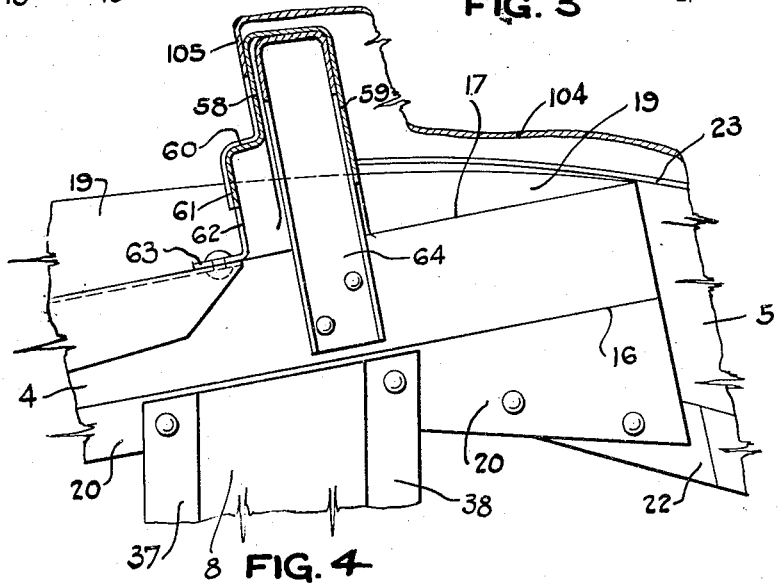

The various figures of the drawings are as follows:

Fig. 1 shows in side elevation an automobile body embodying the invention, the doors being omitted therefrom, Fig. 2 is a central longitudinal sectional view showing the rear portion of the body illustrated in Fig. 1, Fig. 3 is an enlarged detail view of the construction at the base of the rear door post, Fig. 4 is a sectional view on line 4—4 of Fig. 3, Fig. 5 is a plan view of the frame taken from line 5—5 of Fig. 2, showing a longitudinal half of the body frame, the body paneling being omitted for clearness and the frame being transversely broken in several places, Fig. 6 is a vertical sectional view taken on line 6—6 of Fig. 5, Fig. 7 is a vertical transverse sectional view taken on line 7—7 of Fig. 5, Fig. 8 is a vertical transverse sectional view taken on line 8—8 of Fig. 5, Fig. 9 is a vertical sectional view taken on line 9—9 of Fig. 5, Fig. 10 is an elevational view looking from line 10—10 of Fig. 5, in the direction of the arrows, and Fig. 11 is a section taken on line 11—11 of Fig. 5.

The body of the coupé type illustrated in Fig. 1 may be said to comprise three main sections, namely, the cowl section 1, the seat section 2, and the rear deck section 3.

Since the frame of the body controls the structure founded thereon, reference should be had to Fig. 5 of the drawings, wherein a plan view of a longitudinal half of the body frame is shown, it being understood that the opposite half is the same. The frame is formed of the main body side sills 4; the rear deck side sill 5; the rear deck rear sill 6; cross braces 7, 8 and 9; and diagonal braces 10. The frame also includes the vertical post 11 at the front of the door opening, referred to hereinafter as the A post, the vertical post 12 at the rear of the door opening, this post to be known as the B post, and a longitudinal header 13 connecting these posts. (See Fig. 1). The rear deck portion has vertical braces 14 and a support 15 adapted to carry or support the spare tire carrier. (See Fig. 2.) A detailed description of these elements, together with an account of their cooperative relationships, will now be given.

The main body side sills 4 are downwardly presenting flanged channel members extending from forwardly of the A post to a slight distance rearwardly of the B post and are arranged in angular relationship with the rear deck side sills. The inner arm 16 of these channel members extends downwardly a lesser distance than the outer arm 17 thus enabling the body paneling to be carried downwardly on the outside of the sill sufficient distance to give the body a finished appearance along its lower edge. The outer flange of the sill between the A and B posts has a downwardly and inwardly turned flange 18 (Fig. 1), which serves as a finish strip for the threshold and also acts to strengthen the sill at this point.

The rear of the sill is provided with a peculiar configuration, whereby the outer flange 19 gradually diminishes in width starting at the B post, while the inner flange 20 increases in width. This is clearly shown in Figs. 4, 5 and 11, and the purpose of such arrangement will soon become apparent.

The rear deck side sills 5 are upwardly presenting channel members, the inner arms 21 of which have an inwardly extending flange 22. The forward end of each sill 5 is angularly offset outwardly, as shown in Fig. 5; the flange 22 gradually increasing in width at this point, and the outer arm 23 curving outwardly to account for the outward offset.

The rear end of the main body side sill is placed upon the front end of the rear deck side sill 5 so that the inner flange 20 of the former rests upon the flange 22 of the latter, while the diminishing outer flange 19 rests upon or nests in the web portion of the rear deck side sill so as to follow and merge into the outer arm 23 thereof. The sills may be secured together at these points by riveting, welding, or other suitable means.

This connection or joint between the sills readily recommends itself because of its simplicity and great strength. It will be apparent that, in effect, a box girder construction is provided at the point in the frame subjected to the greatest stresses and strains.

The rear deck rear sill 6 is an upwardly presenting channel member, similar in cross section to the sill 5. As shown in Figs. 5 and 8, the sill 6 has its outer arm 24 slightly turned inwardly, while its inner arm 25 has an inwardly (with respect to the body frame) projecting flange 26. This sill is slightly curved transversely of the body in order to provide a pleasing curved contour to the rear thereof.

At the rear end of the sill 5, the sill is rounded on its outer corner, the outer arm 23 being extended inwardly of the body on a curve, as 28, so that its end is substantially at a right angle to the main body thereof. The inner flange 22 and the arm 21 of the sill stop substantially at the point where the arm 23 commences to curve inwardly. The inner flange 26 and arm 25 of the rear sill does not extend the full width of the sill but ends at a point adjacent to the side sill. On the other hand, the outer arm 24 extends the full width, being curved and inwardly offset as shown in Fig. 5. The end of the sill 6 is placed over the inwardly extending angular portion of the sill 5, the curved portion 27 of the arm 24 passing inside of the curved portion 28 of the arm 23. As in the case of the main body side sill and the rear deck side sill, the sills 5 and 6 may be secured together at their junction point by riveting, welding or other suitable means.

The cross brace 8 is arranged transversely of the body between the B posts and is a downwardly presenting flanged channel member. The flanges 37 and 38 rest upon and are secured to the inner flanges of the side sills, the ends of the brace bearing against inner arm 16 thereof.

To the rear of the junction point between the main body side sill and the rear deck side sill, another upwardly presenting flanged channel member 9 provides an additional cross brace. The flanges 39 and 40 thereof bear against the under side of the flange 22 and are secured thereto, the end of the brace bearing against the arm 21 of the member 5. An upwardly presenting channel member 41 is nested within the cross brace, and has its bottom portion extending beyond each end thereof. These extensions pass beneath the bottom of the rear deck side sill and are suitably secured thereto, as shown in Fig. 5. Openings 42 are provided in the cross brace and channel for the passage of body bolts.

A pair of diagonal braces 10 are arranged at the rear of the frame, each of these braces extending from the side sill at the post 14 to a point midway of the rear sill. Since these diagonal braces are identical there is need to describe but one. The drawings clearly indicate that these braces are formed of upwardly presenting flanged channel members comprising the vertical arms 43 and 44 and the flanges 45 and 46. The arms 43 and 44, as well as the flanges 45 and 46, terminate short of the ends of the brace in such manner that the flanges rest beneath and are secured to the inner flanges of the rear deck side and rear sills, respectively. The web or bight portion of the braces, on the other hand, are extended forward and rearward so as to lie beneath and be secured to the bottom of the sills referred to. Apertures 47 are provided in the diagonal braces for the passage of the chassis body bolts.

The B post 12 is an inwardly facing flanged channel member having forward and rear arms 58 and 59, respectively, the forward arm 58 being provided with a forwardly extending flange 60. The flange 60 has an inwardly extending flange 61 from a point approximately midway of the post to the main body side sill. These flanges constitute a door post or door jamb. The B post rests upon the sill 4 on the outer flange 19 thereof and lies against the outer arm 17. The lower part of the flange 61 extends inwardly and forwardly as shown at 62, lying upon the outside of the seat support and the outer arm of the sill, to which members they may be riveted, welded, or otherwise secured. This forwardly projecting part of the flange may be designated as tab 63. A channel member 64 is nested within the B post, being preferably welded thereto, and extends downwardly on a curve across the top of the sill 4, to which it is either welded, riveted or otherwise secured. This connection forms a rigid securing means for the B post. The rear flange 59 of the post bears against the end of the outer arm 23 of the sill 5 and against arm 17 of the sill 4.

The vertical brace 14 for the rear deck portion is in the main an outwardly facing channel member. However, adjacent each end the channel is flattened out as indicated at 66 and 67 in Fig. 2. The flattened portion 66 is adapted to receive the rear deck paneling while the end 67 is for attachment of the brace to the sill 5. The web of the brace bears against the inner arm 21 of the sill 5 while the flattened portion 67 extends outwardly so as to be fastened to the web of the sill.

At the rear of the body a channel member 15 has its lower end secured to the rear deck rear sill and is bent upwardly at an angle so that its arms face inwardly and downwardly. This member is provided with an opening 68 for the reception and anchoring therein of a spare tire carrier. Similarly another inwardly facing channel member 69 is secured to the diagonal braces 10 and extends upwardly in angular relation to the member 15 so as to meet the same at the lower end of the opening in the rear deck housing. The upper end of the member 69 fits within the upper end of the member 15, as shown in Fig. 10, and is secured thereto.

The body paneling is applied and secured to the framing hereinbefore described in the usual manner by flanging the edges and spot welding to the frame. Suffice it to say that in the present instance the rear side portion thereof comprises an upper panel 104 and a lower panel 110 which makes the side of the rear deck. These portions 110 have their upper section curved as at 111, while their lower section is straight as at 112. Between the two sections the paneling is provided with a curved outward offset 113 forming a support for the rear mud guard. The inner end of the section 111 is downwardly flanged for cooperation with a similar flange on the rear deck cover panel 115. These cooperating flanges are welded or otherwise secured together.

The rear deck cover panel 115 has its lower edge inwardly flanged beneath the rear deck rear sill and extends upwardly in a compound curved to join with the bottom flange of the rear body panel 108. In the central portion of the rear deck cover panel 115 an opening is provided to permit access to the space within the rear deck. This opening is covered by the deck lid 118.

The foregoing description, in detail, of the body has clearly demonstrated the manner in which the desired objects of the invention are accomplished. The coaction and interrelation between the various elements forming the body have been brought out, as have also the arrangements whereby lightness, compactness and strength are obtained. In adding the following claims hereto, it is understood that the invention will be deemed to include other modifications and arrangements thereof, provided the same fall within the scope of the said claims.

I claim:

1. In a vehicle body construction, a main body side sill and a rear deck side sill arranged in angular relation with each other, the main body side sill being a downwardly facing flange channel member, the rear deck side sill being an upwardly presenting channel member the outer arm of which is curved and the inner arm of which is flanged the outer flange of the body side sill nesting within the deck side sill being formed on a diminishing curve merging into the outer arm of the deck side sill, and the inner flange of said body sill being formed with an increasing breadth and resting upon the inner flange of said deck sill, whereby the transverse dimension of the body sill is substantially uniform.

2. In a vehicle body construction, upwardly presenting flanged channel sill members, an upwardly presenting flanged channel cross brace, and an upwardly presenting channel reinforcing member nested within and secured to said cross brace, the flanges of said cross brace being secured to a flange of the sill members and the base of the reinforcing member being extended and secured to the base of the sills.

3. In a vehicle body construction, a rear sill having a member secured thereto extending upwardly at an inward incline, diagonal brace members connected to said rear sill having an upwardly extending member secured thereto, said inclined member meeting said last named member and secured thereto, whereby a vertical brace for the rear deck housing and a support for the spare tire carrier is provided.

4. In a vehicle body construction, a rear sill, a channel member having its ends connected to said sill and extending upwardly at a forward incline with the channel presenting inwardly, diagonal braces connected to said sill beneath the point of its connection with the channel member, and an inwardly facing channel member secured in vertical position to said braces and having its upper end nested within the first named channel adjacent the end thereof, whereby a vertical brace for the rear deck housing and a support for the spare tire carrier is provided.

5. In a vehicle body construction, a rear sill, diagonal bracing members connected thereto, and an upwardly extending member arranged upon said diagonal bracing members and forming a tie between said members and a support for the rear deck housing at the rear of the opening therein.

6. A vehicle body construction comprising a side and rear sill sections of angular section having substantially horizontal arms and substantially vertical arms emanating from the outer edge of the horizontal arms, said side and rear sill sections being joined together by an overlapping engagement of both said vertical and horizontal arms, the vertical arms being curved to form a rounded corner and overlapping in said rounded corners.

In testimony whereof he hereunto affixes his signature.

JOSEPH LEDWINKA.